(12) United States Patent
Uno et al.

(10) Patent No.: US 7,719,735 B2
(45) Date of Patent: May 18, 2010

(54) HOLOGRAM RECORDER

(75) Inventors: Kazushi Uno, Kawasaki (JP); Kouichi Tezuka, Kawasaki (JP); Hiroyasu Yoshikawa, Kawasaki (JP); Yasumasa Iwamura, Kawasaki (JP); Yuzuru Yamakage, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 12/190,873

(22) Filed: Aug. 13, 2008

(65) Prior Publication Data

US 2008/0304122 A1 Dec. 11, 2008

Related U.S. Application Data

(63) Continuation of application No. PCT/JP2006/302505, filed on Feb. 14, 2006.

(51) Int. Cl.
G03H 1/04 (2006.01)
(52) U.S. Cl. .............................. 359/35; 359/11; 359/10
(58) Field of Classification Search .................. 359/35, 359/10, 11
See application file for complete search history.

(56) References Cited

U.S. PATENT DOCUMENTS 4,018,503 A * 4/1977 Silverman et al. ............. 359/11
6,157,473 A    12/2000 Jang et al.
6,661,548 B2 * 12/2003 Klug et al. ..................... 359/23
6,700,686 B2 *  3/2004 King et al. ..................... 359/11
2005/0270610 A1 12/2005 Moon
2005/0275916 A1 12/2005 Mitsuya
2007/0081206 A1  4/2007 Tsukagoshi et al.
2008/0158628 A1  7/2008 Tsukagoshi et al.

FOREIGN PATENT DOCUMENTS

| JP | A 2000-206856 | 7/2000 |
| JP | A 2005-148242 | 6/2005 |
| JP | A 2005-301143 | 10/2005 |
| JP | A 2005-352454 | 12/2005 |
| JP | A 2006-23704  | 1/2006 |

* cited by examiner

*Primary Examiner*—Audrey Y Chang
(74) *Attorney, Agent, or Firm*—Greer, Burns & Crain, Ltd (57) ABSTRACT

A hologram recorder (A) records holograms in a selected unit recording area (B1) of a hologram recording medium (B) by interference between a recording beam (Lr) which is applied vertically to the unit recording area (B1) and a reference beam (Lr) which is applied obliquely to the unit recording area (B1). The hologram recorder (A) includes a reference beam oblique applier (23A, 23B) for application of the reference beam (Lr) obliquely to the unit recording area (B1) by reflection, and a reference beam swing mechanism (30) for supporting the reference beam oblique applier (23A, 23B) and for swinging the reference beam oblique applier (23A, 23B) about a predetermined rotation axis which is perpendicular to an entering direction of the recording beam (Lw) that makes an entry into the unit recording area.

4 Claims, 6 Drawing Sheets

HOLOGRAM RECORDER

This application is a Continuation of application No. PCT/JP2006/302505, filed Feb. 14, 2006.

TECHNICAL FIELD

The present invention relates to hologram recorders for recording holograms in hologram recording media.

BACKGROUND ART

A conventional hologram recorder is disclosed in Patent Document 1 for example. This hologram recorder uses so-called angular multiplex method in recording holograms. A recording beam (signal beam) is applied perpendicularly to a unit recording area in a recording medium while a reference beam (baseline beam) is applied to the unit area at a slanted angle. The reference beam is guided by two wedge-shaped prisms, a flat-plated third mirror and a parabolic mirror to the unit recording area. After passing through the wedge-shaped prisms, the reference beam is reflected by the flat-plate mirror, and then by an inner surface of the parabolic mirror before reaching the unit recording area. In this process, the wedge-shaped prisms are controlled to take appropriate attitudes so that the reference beam is directed to a desired location on the inner surface of the parabolic mirror.

Specifically, the reference beam's entering direction is varied in a rotating manner about the normal of incidence in the three-dimensional space. Further, the reference beam's entering angle is varied within a predetermined range of oblique angles with respect to the unit recording area. Each time the reference beam's entering direction and/or entering angle is varied in this way, there is an interference by the recording beam, and as a result, holograms of different interference patterns according to the different entering directions and different entering angles of the reference beam are recorded in the unit recording area of the recording medium. According to such an arrangement, it is possible to bring the reference beam into the interference from a variety of directions with respect to the recording beam, and therefore to increase hologram multiplicity in the unit recording area.

Patent Document 1: JP-A-2000-206856

DISCLOSURE OF THE INVENTION

Problems to be Solved by the Invention

However, according to the above-described conventional hologram recorder, the reference-beam optical system components such as the parabolic mirror tend to be large, and the system tends to be complicated. In addition to this, the recording-beam and the reference-beam optical systems must be disposed closely to the recording medium. Because of these, there has been a problem of increased size and complicated composition.

The present invention was made under the above-described circumstances. An object of the present invention is to provide a hologram recorder which is small, has a simple composition, and is capable of increasing hologram multiplicity easily.

Means for Solving the Problems

In order to solve the above-described problems, the present invention makes use of the following technical means.

A hologram recorder provided by the present invention records holograms in a selected unit recording area of a hologram recording medium by interference between a recording beam which is applied vertically to the unit recording area and a reference beam which is applied obliquely to the unit recording area. The hologram recorder includes: s reference beam oblique applier for application of the reference beam obliquely to the unit recording area by reflection; and reference beam swing mechanism for supporting the reference beam oblique applier and for swinging the reference beam oblique applier about a predetermined rotation axis which is perpendicular to an entering direction of the recording beam that makes an entry into the unit recording area.

Preferably, the reference beam swing mechanism includes: an arm member having an axis base which is positioned on the rotation axis and an arm which extends from the axis base to hold a first tip provided with the reference beam oblique applier, at an obliquely upper location above the unit recording area; and a drive motor for rotating the axis base of the arm member about the rotation axis.

Preferably, the arm member is rotated within a predetermined range of rotation, thereby enabling the first tip to assume a position which is obliquely above on one side of the unit recording area and a position which is obliquely above on another side of the unit recording area.

Preferably, the arm member further includes a second tip which is held oppositely to the first tip, with the unit recording area at a center in between. The second tip is also provided with another reference beam oblique applier for application of the reference beam obliquely to the unit recording area by reflection.

Preferably, the axis base of the arm member is provided with reference beam reflection means for reflection of the reference beam, which comes along the rotation axis, selectively toward one of the reference beam oblique applier provided at the first tip and said another reference beam oblique applier provided at the second tip.

Preferably, the reference beam oblique applier includes a galvanomirror which is capable of variable control on a direction in which the reference beam travels.

BEST MODE FOR CARRYING OUT THE INVENTION

Preferred embodiments of the present invention will be described below with reference to the accompanying drawings. FIG. 1 through 6 show an embodiment of the hologram recorder according to the present invention.

Figure 1:
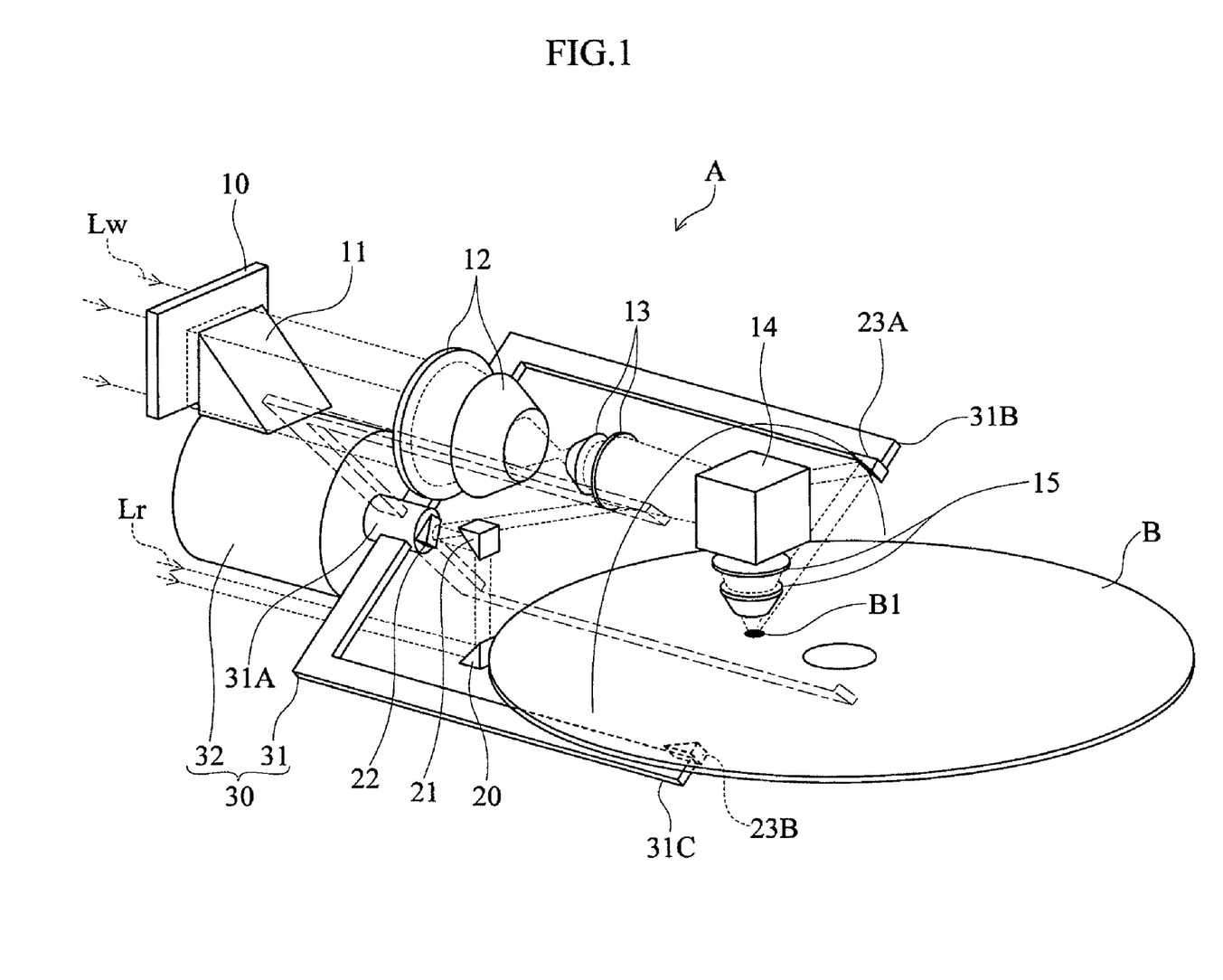
FIG. 1 is an overall perspective view of a hologram recorder according to an embodiment of the present invention.

A hologram recorder A in FIG. 1 records holograms in a disc-shaped hologram recording medium B by means of an angular multiplex method. The hologram recorder A includes a recording-beam optical system for applying a recording beam Lw perpendicularly to a unit recording area B1 in the hologram recording medium B; a reference-beam optical system for applying a reference beam Lr to the unit recording area B1 at an angle; and a reference beam swing mechanism 30. Unillustrated components include a beam source which generates a laser beam, and a beam splitter for splitting the laser beam into the recording beam Lw and the reference beam Lr. The recording-beam optical system is composed of a spatial light modulator 10, a reproduction beam separation beam splitter 11, a first and a second relay lenses 12, 13, a servo beam separation beam splitter 14, and a recording-beam objective lens 15. The reference-beam optical system include two fixed reflection members 20, 21, reference beam reflection means 22, and two reference beam oblique appliers 23A, 23B. The reference beam reflection means 22 and the reference beam oblique appliers 23A, 23B are supported by the reference beam swing mechanism 30. The reference beam swing mechanism 30 is composed of a U-shaped arm member 31 which is capable of swinging about a rotation axis defined along a radial direction of the hologram recording medium B, and a drive motor 32 which rotates the arm member 31 about the rotation axis. It should be noted here that the recording-beam and reference-beam optical systems as well as the reference beam swing mechanism 30, etc. are mounted on a carrier head (not illustrated) which is movable radially of the hologram recording medium B.

The hologram recording medium B has a recording layer made of a photo polymer for example. The beams are applied from both of the upper and the lower sides of the recording layer per unit recording area B1. When recording, the recording beam Lw and the reference beam Lr are applied from above the unit recording area B1. The recording beam Lw enters vertically to the unit recording area B1 while the reference beam Lr enters obliquely to the recording beam, causing an interference. If the angle of the reference beam Lr with respect to the recording beam Lw is varied during this process, the interference stripe pattern is varied according to the angle, and these different patterns are recorded in multiplicity as page-by-page holograms. When reproducing, only the reference beam Lr is applied from below the unit recording area B1, whereby the unit recording area B1 gives off a reproduction beam Lp in the opposite direction as to the recording beam Lw (see FIG. 5 and FIG. 6). The reproduction beam Lp is detected by an unillustrated reproduction-purpose beam reception sensor so the information recorded in the form of hologram is reproduced.

The laser beam which comes out of the unillustrated beam source is converted into a parallel beam by an unillustrated collimator lens, and thereafter split by the beam splitter into the recording beam Lw and the reference beam Lr. The recording beam Lw travels to the spatial light modulator 10 while the reference beam Lr travels to the fixed reflection member 20.

The spatial light modulator 10, which is provided by a transparent liquid crystal device for example, modulates the incoming recording beam Lw into a beam which has a two-dimensional pixel pattern in accordance with the information to be recorded. The recording beam Lw which comes out of the spatial light modulator 10 passes through the reproduction beam separation beam splitter 11, to the relay lenses 12, 13. After passing the relay lenses 12, 13, the recording beam Lw is introduced into the servo beam separation beam splitter 14, then passes through the recording-beam objective lens 15, and finally hits the unit recording area B1 vertically in the hologram recording medium B. The spatial light modulator 10 and the reproduction beam separation beam splitter 11 are supported by an unillustrated support member. On the other hand, the relay lenses 12, 13, the servo beam separation beam splitter 14, and the recording-beam objective lens 15 are supported by an unillustrated lens holder which is a different member from the support member. The support member and the lens holder are disposed at a distance from each other, and the optical path of the recording beam Lw is in an uncovered state between the reproduction beam separation beam splitter 11 and the relay lens 12. Specifically, the arm member 31 can move through the space between the beam splitter 11 and the relay lens 12, across the optical path of the recording beam Lw.

The fixed reflection members 20, 21, which are disposed below the relay lens 12 and in front of the drive motor 32, are suspended by the lens holder. It should be noted here that the lens holder is held by the carrier head via a frame (not illustrated) which detours the arm member 31. The reference beam Lr enters the reference beam reflection means 22 via these fixed reflection members 20, 21.

Figure 4:
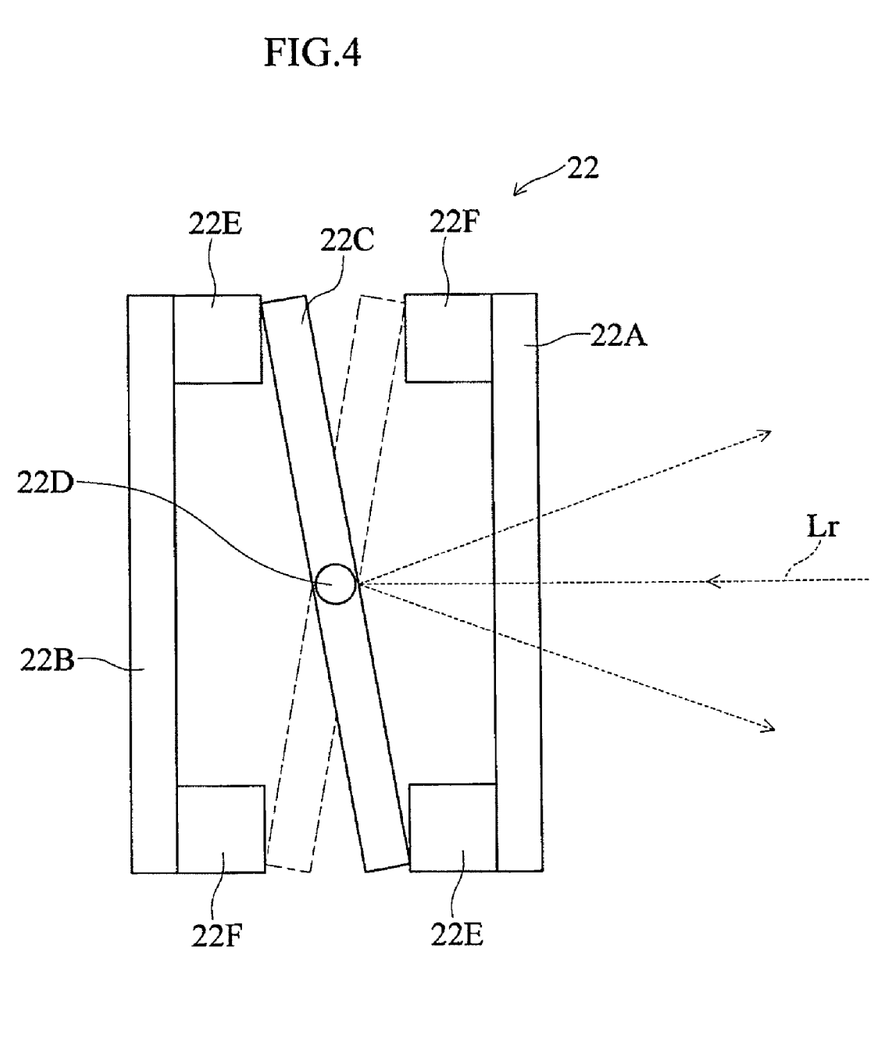
FIG. 4 is a side view of a constituent element included in the hologram recorder in FIG. 1.
Figure 5:
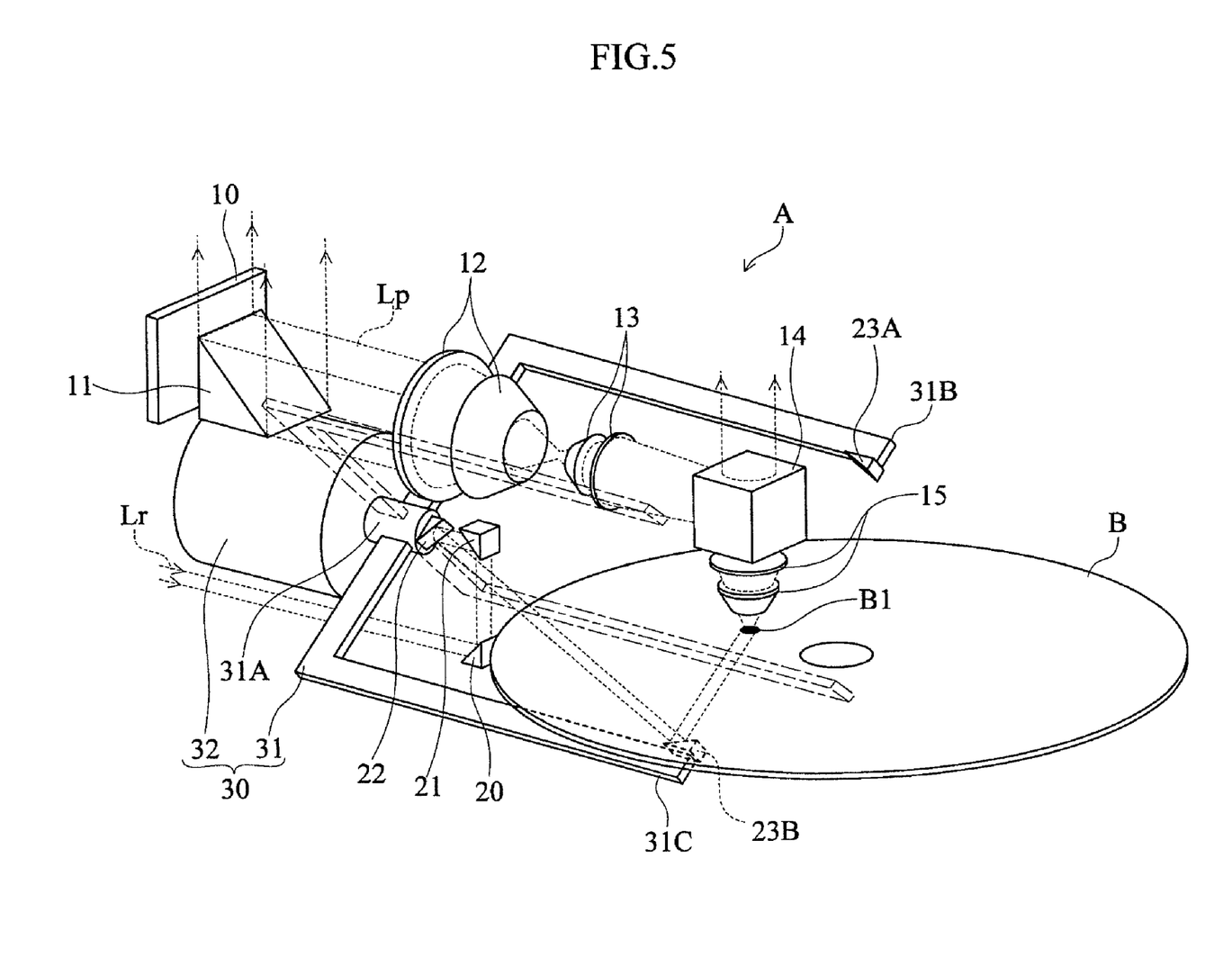
FIG. 5 is an explanatory diagram for describing an operation of the hologram recorder in FIG. 1.

The reference beam reflection means 22 is disposed at an axis base 31A which provides a center of rotation for the arm member 31. As shown in FIG. 4, the reference beam reflection means 22 includes a front panel 22A through which the reference beam Lr passes, a back panel 22B and a rotating reflector 22C between the two panels. The reference beam Lr enters the rotating reflector 22C from a predetermined direction. The rotating reflector 22C is pivotable around a pivot shaft 22D in both directions. When the rotating reflector 22C is pivoted counterclockwise as illustrated in solid lines in the figure for instance, the rotating reflector 22C makes contact, on its two ends, with stoppers 22E which are disposed diagonally on the inner surfaces of the front panel 22A and the back panel 22B. At this point, the rotating reflector 22C becomes halted, being unable to pivot any further, and the reference beam Lr is reflected in a predetermined, obliquely upward direction. Thus, the reference beam Lr which is reflected by the reflection surface of the rotating reflector 22C travels along this predetermined, obliquely upward direction of reflection, to a first tip 31B of the arm member 31 which is positioned above the hologram recording medium B. On the contrary, when the rotating reflector 22C is pivoted clockwise as illustrated in phantom lines in the figure, the rotating reflector 22C makes contact, on its two ends, with stoppers 22F which are a different set of stoppers. At this point again, the rotating reflector 22C becomes halted, being unable to pivot any further, and the reference beam Lr is reflected in a predetermined, obliquely downward direction. Thus, the reference beam Lr which is reflected by the reflection surface of the rotating reflector 22C travels along this predetermined, obliquely downward direction of reflection, to a second tip 31C of the arm member 31 which is positioned below the hologram recording medium B.

The reference beam oblique appliers 23A, 23B are provided by galvanomirrors, for example. One of the means, i.e. the reference beam oblique applier 23A, is fixed to the first tip 31B of the arm member 31 which is positioned above the hologram recording medium B. This reference beam oblique applier 23A works at the time of recording, by reflecting the reference beam Lr which comes from the reference beam reflection means 22, allowing the reference beam Lr to enter the unit recording area B1 from an obliquely upper direction. The other of the means, i.e. the reference beam oblique applier 23B, is fixed to the second tip 31C of the arm member 31 which is positioned below the hologram recording medium B. This reference beam oblique applier 23A works at the time of reproducing, by reflecting the reference beam Lr which comes from the reference beam reflection means 22, allowing the reference beam Lr to enter the unit recording area B1 from an obliquely lower direction. According to the reference beam oblique appliers 23A, 23B which are provided by galvanomirrors as described, it is possible to make fine adjustment quickly and accurately on the entering angle of the reference beam Lr in the unit recording area B1.

The axis base 31A of the arm member 31 is disposed substantially on a straight line along a radius of the hologram recording medium B. The axis base 31A is rotated by the drive motor 32 about a rotation axis which lies radially of the hologram recording medium B. The rotation axis of the arm member 31 is perpendicular to the normal of incidence on the unit recording area B1. The normal of incidence is identical with the optical axis of the recording beam Lw which enters the unit recording area B1. The drive motor 32 is provided by e.g. a supersonic motor which is capable of providing quick and accurate position control. The first tip 31B of the arm member 31 is positioned as extended in parallel to the hologram recording medium B obliquely above the unit recording area B1, whereas the second tip 31C is positioned as extended in parallel to the hologram recording medium B obliquely below the unit recording area B1. As the arm member 31 rotates, the first tip 31B moves, as illustrated in solid lines and phantom lines in FIG. 2, from an obliquely upper right position to an obliquely upper left position, or vise versa, over the unit recording area B1. In this process, the second tip 31C moves from an obliquely lower left position to an obliquely lower right position of the unit recording area B1 since the second tip 31C is disposed in symmetry to the first tip 31B, with the center of symmetry being the unit recording area B1.

Specifically, at the time of recording, the first tip 31B moves from an obliquely upper right position to an obliquely upper left position over the unit recording area B1, whereby the entering angle of the reference beam Lr, which makes an entry into the unit recording area B1 obliquely from the reference beam oblique applier 23A of the first tip 31B, is varied within a range from e.g. about obliquely right 45 through 65 degrees as well as within a range from about obliquely left 45 through 65 degrees, by a predetermined increment angle. When reproducing, the second tip 31C moves from an obliquely lower left position to an obliquely lower right position of the unit recording area B1, whereby the entering angle of the reference beam Lr, which makes an entry into the unit recording area B1 obliquely from the reference beam oblique applier 23B of the second tip 31C, is varied similarly as in recording, within a range from e.g. about obliquely left 45 through 65 degrees as well as within a range from about obliquely right 45 through 65 degrees, by the predetermined increment angle. It should be noted here that from a practical stand point, the entering angle of the reference beam Lr should preferably be varied within a range of about 50 through 60 degrees. The reference beam Lr in the reproducing operation is optically conjugate with the reference beam Lr in the recording operation. In the present embodiment, the first tip 31B and the second tip 31C make their travel around the unit recording area B1 at the same radius of revolution. However, there may be an arrangement, for example, that the rotation axis of the arm member is positioned below the hologram recording medium so that the two tips will have a different radius of revolution from each other.

Next, description will cover optical functions at the time of recording and at the time of reproducing.

When recording, the recording beam Lw enters e.g. one unit recording area B1 vertically: The recording beam Lw is modulated by the spatial light modulator 10 into a beam which has a two-dimensional pixel pattern unique to the information to be recorded. The reference beam Lr is reflected by the reference beam reflection means 22 to travel to the first tip 31B of the arm member 31, then is reflected by the reference beam oblique applier 23A of the first tip 31B, and enters the unit recording area B1 to interfere with the recording beam Lw.

Figure 2:
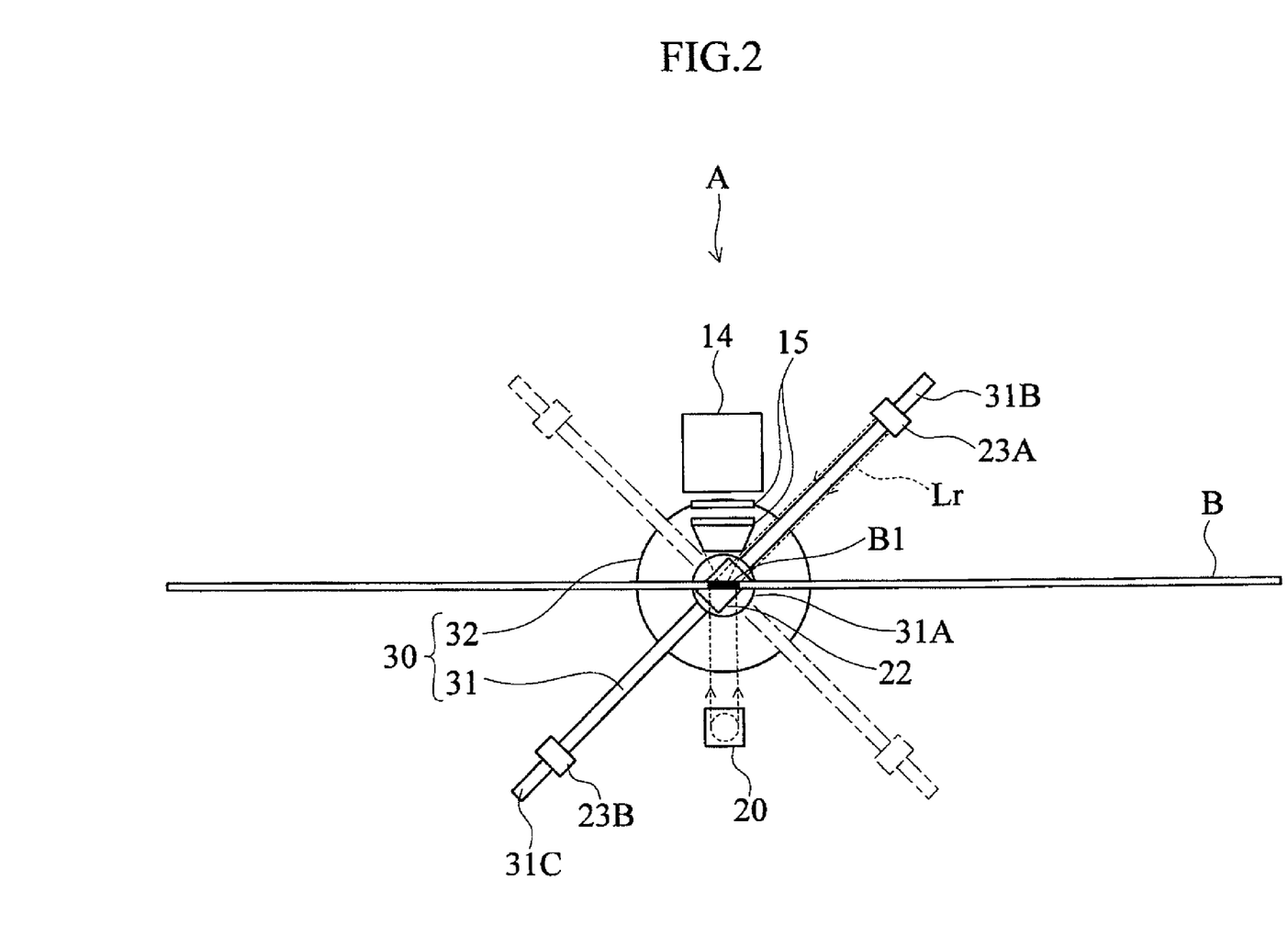
FIG. 2 is a front view of the hologram recorder in FIG. 1.
Figure 3:
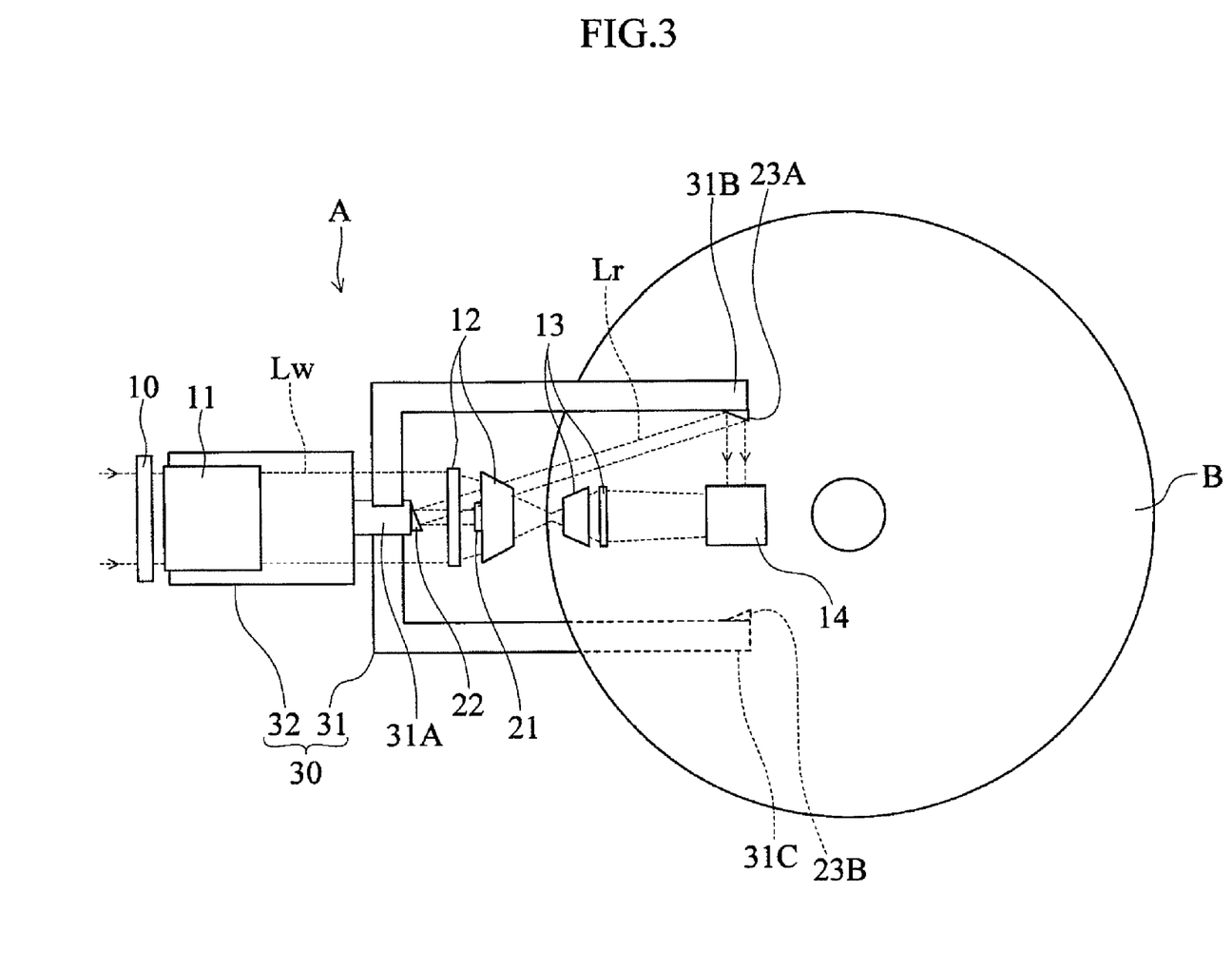
FIG. 3 is a top view of the hologram recorder in FIG. 1.

During this process, each time the recording beam Lw is modulated, the first tip 31B of the arm member 31 is revolved in an intermittent manner by a predetermined angle, within a predetermined angle range defined e.g. obliquely above right of the unit recording area B1 (see the state indicated by solid lines in FIG. 2). After this step, the tip is revolved quickly to an obliquely above left position over the unit recording area B1, and at this obliquely above left position again, is turned intermittently by a predetermined angle, within a predetermined angle range (see the state indicated by phantom lines in FIG. 2). Thus, the reference beam Lr makes its entry into the unit recording area B1 from an obliquely upper right direction while changing its entering angle by a little increment, then makes its entry again into the unit recording area B1 from an obliquely upper left direction while changing its entering angle by a little increment, and at each occasion, the reference beam Lr makes an interfere with the recording beam Lw from a different direction and angle. As a result, page-by-page holograms are recorded in multiplicity in the unit recording area B1, over a predetermined number of pages. It should be noted here that reference beam Lr can become slightly out of alignment with respect to the unit recording area B1 depending on the entering angle of the reference beam Lr. However, the reference beam Lr is maintained accurately at the unit recording area B1 as the reference beam oblique applier 23A, which is provided by a galvanomirror, performs fine adjustment on the reflection angle.

Now, assume that the arm member 31 will be moved within an angle range of about 45 through 65 degrees in a stepped manner by a 5-degree increment, in the obliquely above right range as well as in the obliquely above left range over the unit recording area B1. Then, the reference beam Lr will take ten different patterns as a combination of the entering directions and the entering angles. Thus, one unit recording area B1 will have a multiplicity of ten, which means that there will be a multiplex recording of a ten-page amount of holograms. It should be noted here that the multiplicity can be further increased through an appropriate selection on the range of revolution and the step of angle. Once such a multiplex recording of holograms over a number of pages has been complete in one unit recording area B1 as described, then the same procedure may be repeated to another unit recording area to perform another cycle of the multiplex hologram recording.

At the time of reproducing when holograms are read page by page out of a recorded unit recording area B1, the recording beam Lw is blocked so that it will not enter the spatial light modulator 10 for example. On the other hand, the reference beam Lr is introduced into the second tip 31C of the arm member 31 as the rotating reflector 22C of the reference beam reflection means 22 is shifted to a predetermined pivotal position. Thus, the unit recording area B1 receives only the reference beam Lr which was reflected by the reference beam oblique applier 23B of the second tip 31C, from obliquely below.

Figure 6:
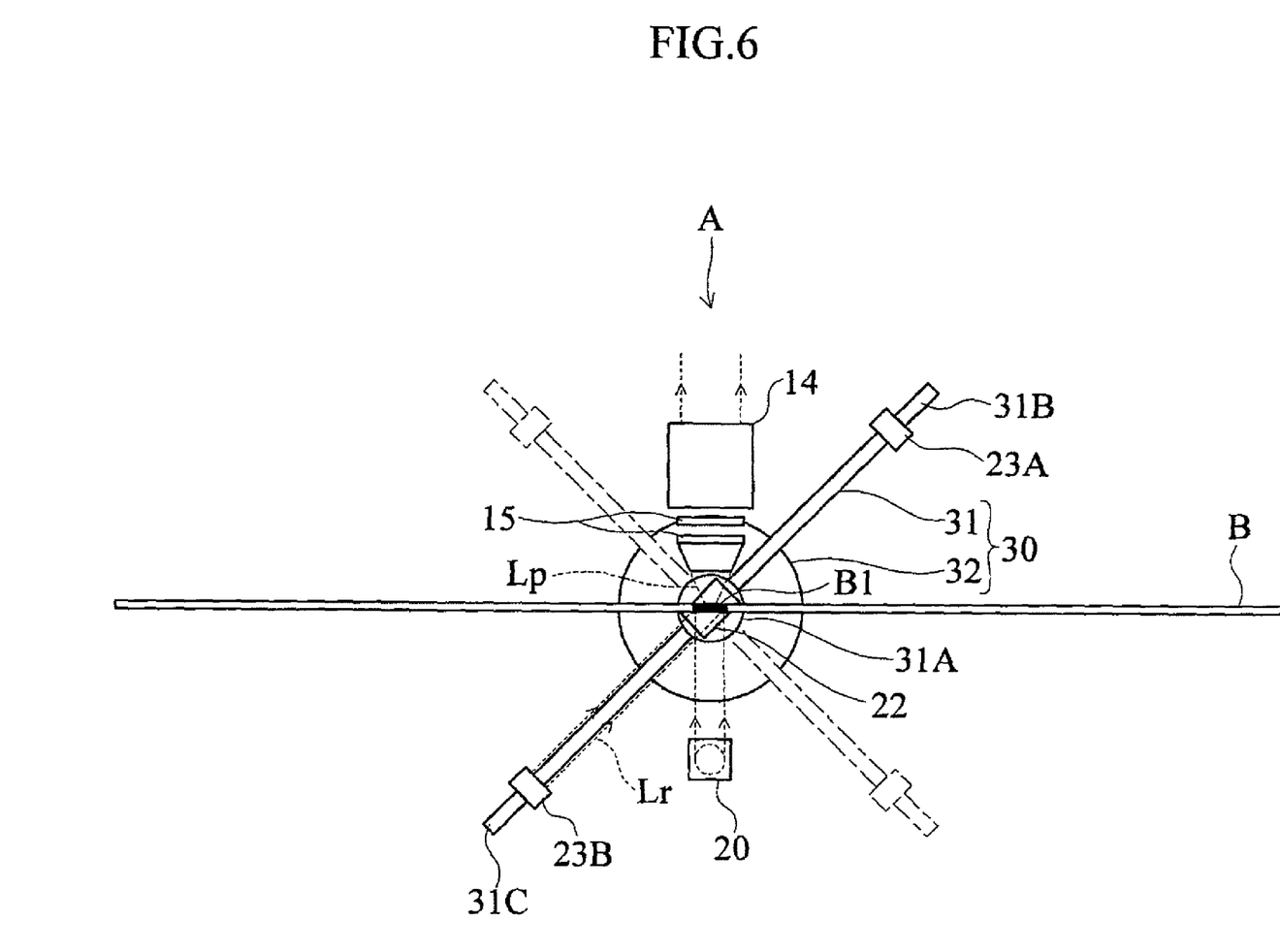
FIG. 6 is an explanatory diagram for describing an operation of the hologram recorder in FIG. 1.

During this process, the second tip 31C of the arm member 31 is revolved intermittently as is at the time of recording, by the predetermined angle within the predetermined angle range defined e.g. obliquely below left of the unit recording area B1 (see the state indicated by solid lines in FIG. 6). After this step, the tip is revolved quickly to an obliquely below right position under the unit recording area B1, and at this obliquely below right position again, is revolved intermittently by the predetermined angle, within the predetermined angle range (see the state indicated by phantom lines in FIG. 6). Thus, the reference beam Lr makes its entry into the unit recording area B1 from an obliquely lower left direction while changing its entering angle by a little increment, then makes its entry again from an obliquely lower right direction while changing its entering angle by a little increment Again, at the time of reproducing, the reference beam Lr is maintained accurately at the unit recording area B1 as the reference beam oblique applier 23B, which is provided by a galvanomirror, performs fine adjustment on the reflection angle. Further, according to the reference beam oblique applier 23B, the reference beam Lr receives fine adjustment on its entering direction and entering angle so that they are identical with the direction and the angle at the time of the recording. It should be noted here that the entering direction of the reference beam Lr at the time of reproducing is the opposite of the direction from the time of recording. Thus, the reference beam Lr makes its entry into the unit recording area B1 in the opposite direction from what it did at the time of recording, making the entry from an obliquely lower left direction while changing its entering angle by a little increment, and then makes its entry again from an obliquely lower right direction while changing its entering angle by a little increment.

Now, assume, as did at the time of recording, that the arm member 31 will be moved within an angle range of about 45 through 65 degrees in a stepped manner by a 5-degree increment while applying the reference beam Lr to the unit recording area B1. Then, in this unit recording area B1, the reproducing reference beam Lr will interfere with holograms which were recorded in multiplicity, page by page according to the direction and the entering angle at the time of the recording. As a result, the unit recording area B1 gives off a reproduction beam Lp page by page. The reproduction beam Lp travels in the opposite direction from what the recording beam Lw did, passing through the object lens 15, the beam splitter 14, then the relay lenses 12, 13, and the reproduction beam separation beam splitter 11 and finally, it is received by the unillustrated reproduction-purpose beam reception sensor, whereby the multiplexed record of holograms is reproduced page by page.

The hologram recorder A according to the present embodiment has a capability to apply the reference beam Lr to the unit recording area B1 from two, i.e. a right and a left, oblique directions while varying the entering angle, and therefore is capable of making multiplex recording of holograms at a higher multiplicity, about two times as compared to a case where the reference beam application is made only from one oblique direction, making it possible to easily increase the multiplicity.

Mechanically, the recorder uses a simple construction that a drive motor 32 rotates an arm member 31 about a predetermined rotation axis. In terms of optics, too, the recorder uses only simple optical parts for beam reflection, adjustment on the reflection angle, etc. Thus, the recorder can be small in size and simple in composition.

When recording or reproducing holograms page by page, the reference beam Lr entering direction and entering angle must be varied, and for this purpose the arm member 31 must be pitched along its path, and swung in the right/left direction along its path. In this process, a drive motor 32 which is provided by a supersonic motor pitches and swings the arm member 31 quickly and accurately, whereas reference beam oblique appliers 23A, 23B which are provided by galvanomirrors adjust the entering angle of the reference beam Lr quickly and accurately. This makes it possible to record and reproduce holograms page by page as quickly as possible, albeit intermittently.

While recording, the rotating reflector 22C of the reference beam reflection means 22 may be activated to quickly switch the direction of reflection from one to the other each time a page of holograms, for example, has been recorded. This arrangement makes it possible to apply the reference beam Lr to interfere with a freshly recorded hologram obliquely from below so as to see if the recording has been made successfully. In other words, the verification process can be performed easily.

The invention claimed is:

1. A hologram recorder for recording holograms in a selected unit recording area of a hologram recording medium by interference between a recording beam applied vertically to the unit recording area and a reference beam applied obliquely to the unit recording area, the hologram recorder comprising:
 a reference beam oblique applier for application of the reference beam obliquely to the unit recording area by reflection; and
 a reference beam swing mechanism for supporting the reference beam oblique applier and for swinging the reference beam oblique applier about a predetermined rotation axis which is perpendicular to an entering direction of the recording beam that makes an entry into the unit recording area;
 wherein the reference beam swing mechanism includes an arm member and a drive motor, the arm member including an axis base positioned on the rotation axis and an arm extended from the axis base to an oblique upper location above the unit recording area, the arm including a first tip disposed at the oblique upper location and provided with the reference beam oblique applier, the drive motor being adapted to rotate the axis base of the arm member about the rotation axis,
 wherein the arm further includes a second tip held oppositely to the first tip, with the unit recording area disposed at a center between the first tip and the second tip, and the second tip is provided with another reference beam oblique applier for application of the reference beam obliquely to the unit recording area by reflection.

2. The hologram recorder according to claim 1, wherein the arm member is rotated within a predetermined range of rotation, thereby enabling the first tip to assume a position which is obliquely above on one side of the unit recording area and a position which is obliquely above on another side of the unit recording area.

3. The hologram recorder according to claim 1, wherein the axis base of the arm member is provided with reference beam reflection means for reflection of the reference beam, which comes along the rotation axis, selectively toward one of the reference beam oblique applier provided at the first tip and said another reference beam oblique applier provided at the second tip.

4. The hologram recorder according to any one of claims 1, 2 and 3, wherein the reference beam oblique applier includes a galvanomirror capable of variable control on a direction in which the reference beam travels.

* * * * *